United States Patent
Beltas et al.

(10) Patent No.: US 12,222,982 B2
(45) Date of Patent: *Feb. 11, 2025

(54) MANIPULATION OF SEQUENCES TO IDENTIFY STATIONS PLAYING SYNDICATED CONTENT

(71) Applicant: iHeart Media Management Services, Inc., San Antonio, TX (US)

(72) Inventors: Periklis Beltas, Astoria, NY (US); Philippe Generali, Scarsdale, NY (US); David C. Jellison, Jr., Ogallala, NE (US)

(73) Assignee: iHeart Media Management Services, Inc., San Antonia, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/501,685

(22) Filed: Nov. 3, 2023

(65) Prior Publication Data

US 2024/0061880 A1 Feb. 22, 2024

Related U.S. Application Data

(63) Continuation of application No. 17/672,837, filed on Feb. 16, 2022, now Pat. No. 11,816,150, which is a continuation of application No. 16/807,506, filed on Mar. 3, 2020, now Pat. No. 11,275,781, which is a continuation of application No. 14/721,179, filed on May 26, 2015, now Pat. No. 10,614,121, which is a continuation of application No. 12/640,522, filed on Dec. 17, 2009, now Pat. No. 9,047,286.

(51) Int. Cl.
*G06F 16/683* (2019.01)
*G06F 16/40* (2019.01)

(52) U.S. Cl.
CPC .......... *G06F 16/683* (2019.01); *G06F 16/40* (2019.01)

(58) Field of Classification Search
None
See application file for complete search history.

(56) References Cited

U.S. PATENT DOCUMENTS

| | | |
|---|---|---|
| 6,009,392 A | 12/1999 | Kanevsky et al. |
| 6,578,047 B1 | 6/2003 | Deguchi |
| 6,901,606 B2 | 5/2005 | Wright et al. |
| 7,352,770 B1 | 4/2008 | Yonge, III et al. |
| 7,610,597 B1 | 10/2009 | Johnson et al. |

(Continued)

*Primary Examiner* — Son T Hoang
(74) *Attorney, Agent, or Firm* — Harness, Dickey & Pierce, P.L.C.

(57) ABSTRACT

Multiple main sequences of media items played by a plurality of different media stations are identified. Each main sequence includes one or more content items, and potentially includes syndicated content. At least one main sequence is removed from further consideration, leaving a plurality of remaining main sequences. The at least one main sequence is removed from consideration based, at least in part, on a number of content items included in the at least one main sequence. Consolidated main sequences are generated by merging one or more remaining main sequences satisfying a consolidation criterion. Each consolidated main sequence includes two or more remaining main sequences. The consolidated main sequences are compared to determine whether syndicated content was played on a particular media station.

20 Claims, 4 Drawing Sheets

(56) References Cited

U.S. PATENT DOCUMENTS

| | | |
|---|---|---|
| 7,814,078 B1 | 10/2010 | Forman et al. |
| 7,921,121 B2 | 4/2011 | Muller |
| 8,010,538 B2 | 8/2011 | Pedersen |
| 2003/0040272 A1 | 2/2003 | Lelievre et al. |
| 2007/0039018 A1 | 2/2007 | Saslow et al. |
| 2007/0061487 A1* | 3/2007 | Moore .................... G06F 16/27 707/E17.032 |
| 2007/0107008 A1 | 5/2007 | Dybus |
| 2008/0028043 A1* | 1/2008 | Garbow ................ G06F 16/437 |
| 2008/0034056 A1* | 2/2008 | Renger ................ G06F 16/437 |
| 2008/0190272 A1 | 8/2008 | Taub et al. |
| 2008/0250023 A1* | 10/2008 | Baker ................. G06F 16/2457 707/999.102 |
| 2008/0319828 A1* | 12/2008 | Southam .................. G06F 16/95 |
| 2009/0043906 A1 | 2/2009 | Hurst et al. |
| 2009/0083228 A1 | 3/2009 | Shatz et al. |
| 2009/0234649 A1 | 9/2009 | Goodhew |
| 2009/0300673 A1* | 12/2009 | Bachet ................. G06F 16/683 |
| 2011/0138411 A1 | 6/2011 | Koontz, III |
| 2011/0153047 A1 | 6/2011 | Cameron et al. |
| 2012/0208448 A1 | 8/2012 | Goto |

\* cited by examiner

| S1:B12 | Content Item 3 | Content Item 2 | Content Item 4 | Content Item 1 | Spot Block |
|---|---|---|---|---|---|
| S2:B4 | Content Item 1 | Content Item 2 | Spot Block | Content Item 3 | Content Item 4 |
| S3:B16 | Content Item 2 | Content Item 3 | Content Item 4 | Spot Block | Content Item 5 |

FIG. 3

| | B1 | B2 | B3 | B4 | B5 | B6 | B7 | B8 | B9 | B10 | B11 | B12 |
|---|---|---|---|---|---|---|---|---|---|---|---|---|
| S1 | A | B | C | D | E | F | G | H | | | | |
| S2 | | | | | | A | B | C | D | I | J | E |
| S3 | | | | | | B | C | D | | | | |
| S4 | A | B | I | J | | | | | | | | |
| S5 | | | | | | | C | D | I | J | | |
| S6 | | A | B | C | D | E | F | G | H | | | |
| S7 | A | B | C | D | E | | | | | | | |

FIG. 4

MANIPULATION OF SEQUENCES TO IDENTIFY STATIONS PLAYING SYNDICATED CONTENT

CROSS REFERENCE TO RELATED APPLICATIONS

The present U.S. Utility Patent Application claims priority pursuant to 35 U.S.C. § 120 as a continuation of U.S. application Ser. No. 17/672,837, filed on Feb. 16, 2022, which is a continuation of U.S. Utility application Ser. No. 16/807,506, entitled "Program and Syndicated Content Detection", filed Mar. 3, 2020, which is a continuation of U.S. Utility application Ser. No. 14/721,179, entitled "Program and Syndicated Content Detection", filed May 26, 2015, now U.S. Pat. No. 10,614,121 issued on Apr. 7, 2020, which is a continuation of U.S. Utility application Ser. No. 12/640,522, entitled "Program and Syndicated Content Detection," filed Dec. 17, 2009, now U.S. Pat. No. 9,047,286 issued on Jun. 2, 2015, all of which are hereby incorporated herein by reference in their entirety and made part of the present U.S. Utility Patent Application for all purposes.

FIELD

The present disclosure relates generally to analyzing media content, and more particularly to detecting program and syndicated content.

BACKGROUND

Technology is currently available to permit broadcasters, data aggregators, media licensing entities, and others to collect data related to broadcast media content. Various analysis techniques can be applied to the collected data to identify user, viewer, or listener demographics and related information. In many cases, the data collection can be substantially automated, but analysis of the collected media content often requires significant human resources.

Sometimes, to determine whether content broadcast on a station is part of a syndicated show, a human manually listens to the radio station, and uses intuition or other human problem solving skills to arrive at a conclusion. This and other techniques currently in use can be inefficient, inaccurate, and time-prohibitive—especially if utilized with a large sampling of stations. Consequently, conventional media content analysis techniques leave room for improvement.

SUMMARY

Various embodiments of the present disclosure enable songs or other media content that have played at a broadcast station to be marked as "syndicated" content when the content items played are controlled by some other entity besides the station broadcasting the media content. At least one method takes a universe of radio stations, one station at a time and "scrubs" the songs that played, in the order they played, against the songs that played on other radio stations, in the order they played, to identify where there is a high likelihood that another radio station is playing the same or very similar content.

A method according to some embodiments includes dividing content, played on each of multiple different stations, into segments based on time, and identifying matched segments associated with each of the multiple stations by comparing content included in a first segment associated with a first station with content included in a second segment associated with a second station. The method can also include identifying syndicated content based, at least in part, on a relationship between sequences of matched segments associated with one of the plurality of stations and sequences of matched segments associated with others of the plurality of stations. Some or all of the steps of this, and other methods described herein, can be implemented by executing a program instruction in a computer system.

In some embodiments, identifying matched segments includes determining whether the first segment includes at least a threshold amount of content in common with the second segment, and determining whether content items common to the first segment and the second segment are in the same order. Various embodiments also include identifying main sequences of matched segments associated with particular stations, wherein a main sequence associated with a first station includes sub-sequences of matched sequences associated with a minimum number of other stations.

Remaining main sequences can be generated by removing at least some of the main sequences from consideration based on a comparison of a number of content items included in the main sequences. Consolidated sequences can be generated by merging remaining main sequences that are subsets of another remaining main sequence. Various methods include designating at least a portion of a consolidated sequence as a show, and comparing content items included in the show to content items included in the main sequences associated with multiple different stations. Particular content items in the main sequences can be tagged, flagged, or otherwise marked or designated based on the comparison.

Various embodiments of the present disclosure can be implemented as an apparatus including a processor, memory and a program of instructions configured to implement any of various methods according to the present disclosure, or as a program of instructions, tangibly embodying a computer readable medium. For example, at least one embodiment of an apparatus includes a processor, memory operably associated with the processor, and a program of instructions to be stored in the memory and executed by the processor. The program of instructions can include at least one instruction to divide content into segments based on time, at least one instruction to identify matched segments by comparing content included in a first segment associated with a first station with content included in a second segment associated with a second station, and at least one instruction to tag syndicated content based, at least in part, on a relationship between sequences of matched segments associated with one of the plurality of stations and sequences of matched segments associated with others of the plurality of stations.

BRIEF DESCRIPTION OF THE DRAWINGS

Aspects of this disclosure will become apparent upon reading the following detailed description and upon reference to the accompanying drawings, in which like references may indicate similar elements:

FIG. 3 is a diagram illustrating matching time segments on different stations according to embodiments of the present disclosure;

FIG. 4 is a diagram illustrating time segments on multiple different stations according to various embodiments of the present disclosure.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

According to some embodiments, automatically detecting content syndication can be utilized to exclude syndicated content from various databases and reports. For example, knowing when syndicated shows occur can, in some instances, facilitate reporting on spots that play in common during times when syndicated content is being broadcast.

Figure 1:
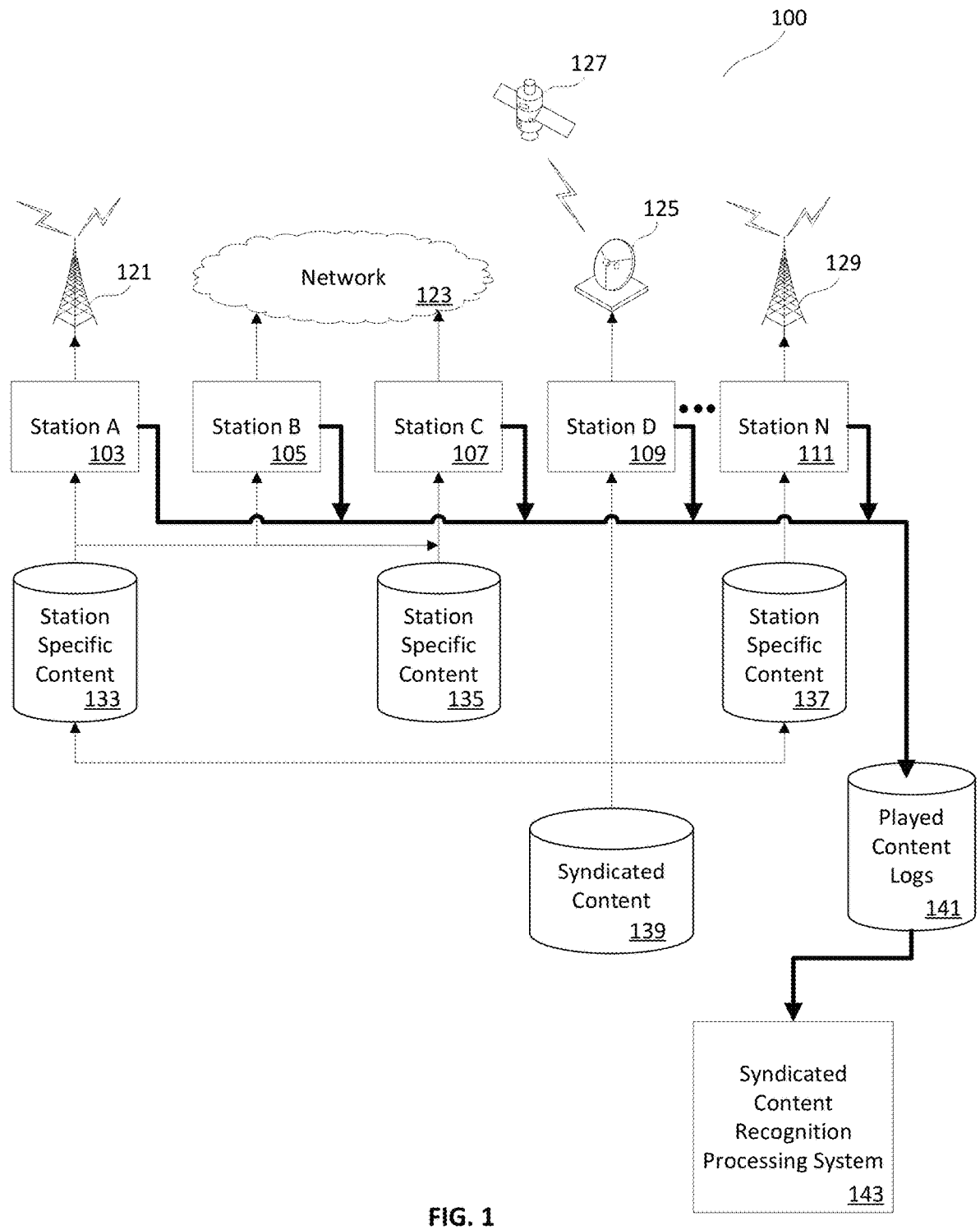
FIG. 1 is a diagram illustrating a system according to various embodiments of the present disclosure.

Referring first to FIG. 1, a system 100 according to various embodiments of the present disclosure is discussed. Various embodiments of the present disclosure can be implemented by a processing system such as Syndicated Content Recognition Processing System 143. In some embodiments, Syndicated-content-recognition Processing System 143 is part of a larger system including some or all of the components illustrated as system 100 in FIG. 1.

System 100 includes broadcast station A 103, station B 105, station C 107, station D 109, and station N 111, each capable of broadcasting media content via any number of different media channels. For example, Station A 103 can broadcast content via a radio tower 121; stations B 105 and C107 can broadcast content via a network 123, which may be, for example, a wide-area network such as the Internet; station D 109 can broadcast media content to satellite 127 via satellite dish 125; and various additional stations, represented as station N 111, can broadcast media content via a media channel represented by transmission tower 129. Transmission tower 129 can represent radio, cellular, microwave, television, cable, or another suitable media channel.

In general, media content broadcast by each of the broadcast stations 103, 105, 107, 109, and 111 can be obtained from one or more databases. In some embodiments, broadcast content for a particular station can be retrieved from a database including station specific content, such as station specific content databases 133, 135, and 137. Station specific content databases 133, 135, and 137 are illustrated as single databases for ease of reference only. Content broadcast by the various stations can be obtained from multiple different sources including, but not limited to, broadcasts from other stations; live content generated in studios, on location, or otherwise; prerecorded content; and various commercial, private, or publicly accessible databases. A database need not be located at a single location, or implemented on any one particular machine. Instead, the database may take advantage of various distributed computing and storage technologies, in which database functionality can be spread between multiple different physical and logical servers or other devices.

In the illustrated example, station A 103 can receive content for broadcast from station specific content database 133. Station specific content database 133 may provide station A 103 with spots, sometimes referred to as commercials, and media content including voice tracks, songs, programs, and other media items to be broadcast via radio tower 121. In some embodiments, a broadcast station can broadcast the same content broadcast by another station, and can obtain content from someplace other than its own, dedicated database. In FIG. 1, for example, station B 105 can obtain content for broadcast from the same station specific content database 133 used by station A 103. An example of one such embodiment can be implemented with streaming radio broadcasts, in which an Internet station broadcasts the same content items as an over-the-air station. In some such embodiments, Station B 105 is capable of broadcasting different spots than those spots broadcast by station A 103, even though station B 105 may not be assigned a station specific content database 133. Station C 107 can be configured to receive content for broadcast from multiple different content databases, for example station specific content database 133, and station specific content database 135.

Station D 109 can be configured to receive syndicated content for broadcast from syndicate content database 139. In some embodiments, content from syndicated content database 139 is also provided to station specific content database 133, and station specific content database 137. Content from syndicated content database 139 can also be delivered to other stations, which can broadcast all or a portion of the same syndicated content. Syndicated content is illustrated as being provided by satellite 127, but it is not limited to the illustrated embodiment. Those skilled in the art will note, however, that it is common to broadcast syndicated television and radio shows and programs via satellite, and for the same satellite feed to be delivered to other stations for syndicated broadcast.

The dark lines flowing from stations A 103, B 105, C 107, D. 109, and N 111 to played-content-logs database 141 and syndicated-content-recognition processing system 143 represent information related to content played, or scheduled to be played, on each station. This information may include, but is not limited to, station logs and other information generated by various broadcasting automation software. In some embodiments, information included in played-content-logs database 141 can be received from a third party that monitors some or all of the broadcast stations. Furthermore, in various embodiments, each station may provide a station log or other information related to broadcast content to one or more internal or third-party providers that collect, aggregate, evaluate, filter, or otherwise process information prior to delivering the information to Syndicated Content Recognition Processing System 143. In yet other embodiments, some information can be provided directly to syndicated-content-recognition processing system 143 by one or more of the station A 103, station B 105, station C 107, station D 109, and station N 111, while other information is obtained from a different source. Played-content-logs database 141 may, in some embodiments, be included as part of syndicated-content recognition processing System 143.

Syndicated-content-recognition processing system 143 can be implemented on a single standalone machine, or a logical server implemented on multiple machines. In some embodiments, syndicated-content-recognition processing system 143 can be included in broadcast or traffic automation software and hardware associated with one or more stations. Syndicated-content-recognition Processing System 143 can be used in various embodiments to identify which a syndicated program or show. As used herein, the term "syndicated" refers not only to media content broadcast, under contract, or other granted permissions, but also includes cases in which one or more segments of a media show, program, or broadcast on one station is copied, duplicated, broadcast, or rebroadcast on other stations, with or without the permission of the original broadcaster or holder of rights in a particular program, show, or media item. It should also be noted that although radio broadcasting is the primary focus of the illustrated examples, the present disclosure is not limited to radio broadcasting, but includes various other types of broadcasting, including television, satellite, Internet, and the like.

Figure 2:
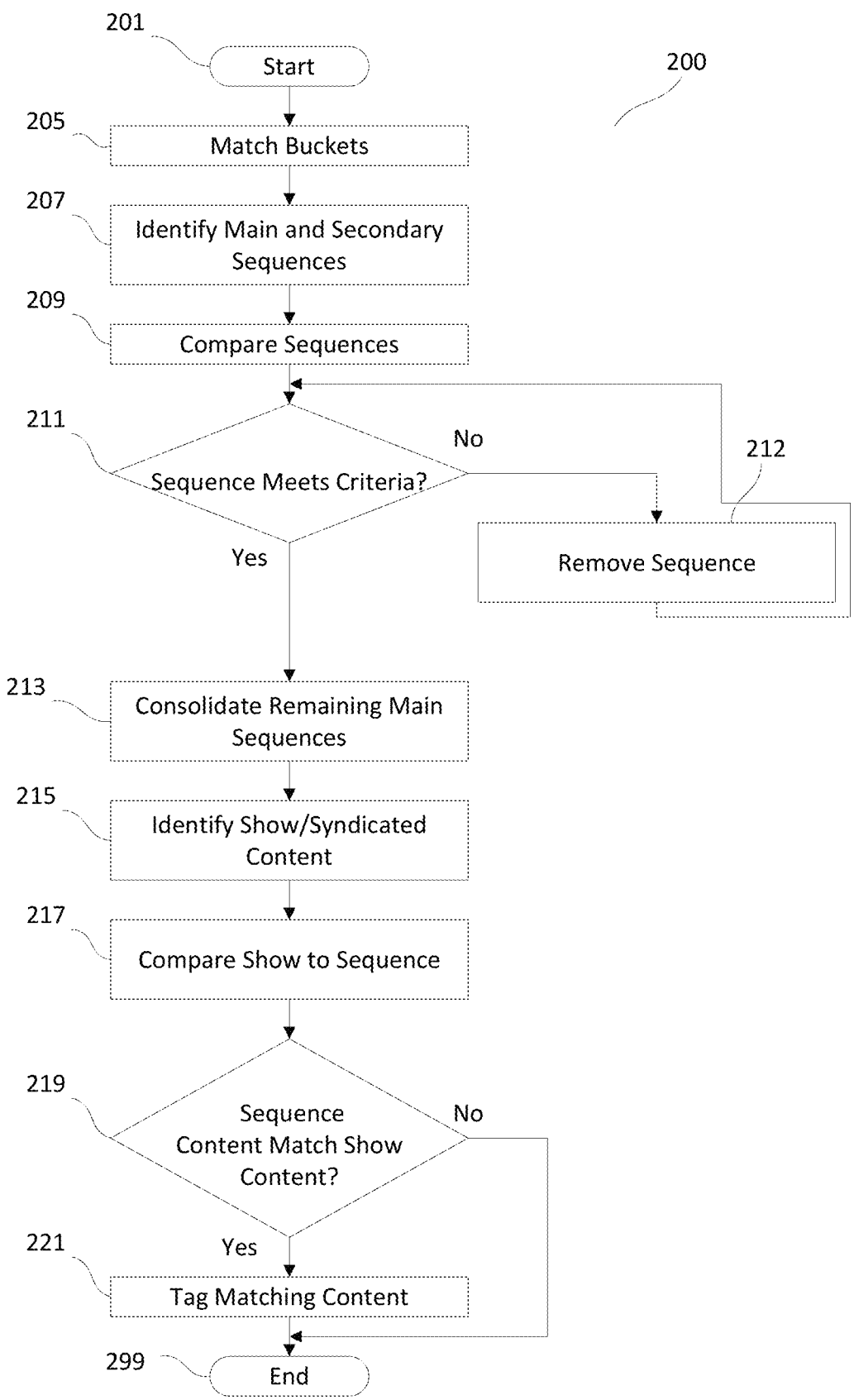
FIG. 2 is a flow chart illustrating a method according to various embodiments of the present disclosure.

Referring next to FIG. 2, method 200 according to various embodiments of the present disclosure is discussed. Method 200 begins at block 201. As illustrated by block 205, time buckets on multiple stations are matched against each other to determine whether the content included in these time buckets is similar to content included in time buckets on other stations. The term "buckets" is used herein to denote time-segments, or intervals, of media content. In some embodiments, buckets are defined by dividing content that was played or broadcast on a particular station into fixed length time-segments. For example, a station log provided by a particular broadcast station can be divided into 15 minute intervals, or intervals of another duration as desired. The content of each 15 minute interval, or bucket, can be determined, and compared against the content of other buckets on the other stations to determine matching buckets.

In at least some embodiments, each bucket of each station is compared against each bucket of every other station in the universe of stations to be compared. So, for example, a 24-hour time period can be split into 96, 15-minute buckets. The first bucket, (bucket B1), of a first station, (station S1), can be compared against buckets B1-B96 of all other stations being considered. Bucket B2 of station S1 can be compared against buckets B1-B96 of all other stations being considered.

Bucket B1 of one of station S2 can be compared against buckets B1-B96 of stations S3, S4, and all of the other stations being considered, except for station S1. In at least one embodiment, no additional comparison needs to be made between buckets of stations S1 and S2, because those comparisons have previously been performed. The number of stations to be compared can, in some instances, be dictated by the number of stations for which played, or broadcast content is available. In other embodiments, fewer than all of the stations for which played a broadcast content is available are chosen for comparison. In at least some embodiments, tens or hundreds of stations can be selected for comparison.

In determining whether or not one bucket matches another, various criteria can be used. In at least one embodiment, one bucket is said to match another bucket if a threshold of at least 50% of the media content, excluding spots, is matched in order. In at least one embodiment, matched content items need not be consecutive. Other embodiments can be implemented in which a match is based on a number of consecutive items, and in which spots are included in determining a match. Bucket matches are discussed in greater detail subsequently, with respect to FIG. 3.

As illustrated by block 207, main sequences and secondary sequences can be identified. The term "secondary sequences" is generally used herein to distinguish between the main sequence of a station under consideration, and main sequences associated with other stations. In other words, when considering whether the main sequence of station S1 matches sequences on other stations, the main sequences of the other stations are referred to as secondary sequences. In at least one embodiment, in order for a sequence of time-segments, or buckets, to be considered a main sequence, a number of criteria or threshold conditions should be met.

For example, various embodiments require each subset of at least "X" consecutive buckets in a potential main sequence match at least "X" consecutive buckets on at least "Y" other stations. And the subset of "X" consecutive buckets in the potential main sequence must be part of a sequence that has a minimum time duration "T." At least one such embodiment requires that each subset of 2 consecutive buckets in a potential main sequence match at least 2 consecutive buckets on at least 3 different stations, and that the subset of 2 consecutive buckets included in the potential main sequence be part of a sequence that is at least one hour-long. Thus, if each subset of 2 consecutive buckets is included in a sequence of 4 15-minute buckets on station S1, and each subset matches 2 buckets on at least 3 different stations, the sequence of 4 15-minute buckets on station S1 can be identified as a main sequence. Sequences are discussed in greater detail subsequently, with respect to FIG. 4.

As illustrated by block 209, main sequences can be compared to secondary sequences, which is another way of saying that main sequences of one station can be compared to the main sequences associated with other stations. In at least one embodiment, the main sequences are compared to secondary sequences to determine whether at least a threshold percentage of media items present in the main sequence are also present in a secondary sequence. Note that this comparison can be based on the number of content items common to both sequences, rather than the number of buckets. In one implementation, a secondary sequence and a main sequence are considered to be possible matches if at least 50% of the total songs or other media items in the main sequence are also present in the secondary sequence. In some embodiments the threshold values can be based on the number of songs or other media items rather than a percentage.

As illustrated by block 211, if the secondary sequence does not include the threshold number or percentage of songs or other media items, the secondary sequence can be removed from consideration, as illustrated by block 212. In some embodiments, additional threshold conditions and considerations can be compared and evaluated concurrently or sequentially.

For example, in at least one embodiment, after removing secondary sequences as illustrated by block 212, another check can be made at block 211 to determine whether a main sequence matches secondary sequences on at least a threshold number of stations. In some such embodiments, a check can be made to determine whether the main sequence matches secondary sequences on at least 5 other stations. The determination as to whether a main sequence matches a secondary sequence can, in some embodiments, be performed in the same manner as an initial check. For example, a check can be made to determine whether or not 50% of the total songs in a main sequence are also found in a secondary sequence. In other embodiments, other suitable criteria may be used. As illustrated by block 212, a main sequence that fails to meet various threshold conditions can be removed from further consideration.

As illustrated by block 213, any remaining main sequences can be consolidated based on a number of different criteria. In various embodiments, a main sequence can be determined to be a candidate for consolidation if it matches sequences on at least a threshold number, or percentage, of stations being considered. For example, a main sequence can be consolidated with another main sequence if the main sequence is present on greater than 50% of the stations being considered. In at least one embodiment, a main sequence is considered to be present on another station if either the main sequence or the sequence with which it is being compared, is a subset of the other, and if the longer of the two sequences is no more than twice the length of the shorter sequence. In other embodiments, other threshold values can be chosen. For example, in some embodiments the threshold percentage of stations may be greater than or less than 50% Likewise, the relative size threshold of the two sequences can be varied so that, for example, even if one of the sequences being compared is less than 50% the size of the other sequence, the two sequences can still be consolidated.

In some embodiments, a situation may arise in which a single secondary sequence matches more than one main sequence. This situation can be handled by applying one or more conditions to determine a particular main sequence with which a secondary sequence should be consolidated. For example, a secondary sequence can be consolidated with the main sequence having the longest sequential number of matching buckets, the longest main sequence, or the main sequence that is matched on the most stations.

As illustrated by block 215, the consolidated main sequences can be used to identify a show, program, syndicated content, or the like. In some embodiments, user input can be utilized to help determine which consolidated sequences are part of a show or program. In other embodiments, historical and other data can be utilized to determine whether or not a consolidated main sequence is likely to include syndicated content. In some such cases, user input can be received from a keyboard, touchscreen, microphone, mouse, or other user input device connected to a processor, server, or other information handling device.

As illustrated by block 217 the identified show can be compared to the main and secondary sequences of each of the stations under consideration. As illustrated by block 219, a check can be made to determine if the main sequence being compared to the show includes content matching show content. In at least one embodiment, media items included in both the identified show and the main sequence being compared to the show are considered to be syndicated content.

As illustrated by block 221, content in each main sequence that matches content included in a show can be tagged, flagged, marked, or otherwise identified as syndicated content. The syndicated content thus identified can be exempted from further processing, and removed from, or included in, various reports as desired. In some embodiments, tagging can be done manually, whereby an operator observes the data in a sequence and determines the proper tag. In other embodiments, tagging can be automated based on historical data for that day of week, hour range and station count, tagging a show deterministically based upon what history tells us is in that day/hour with the same group of stations within a desired tolerance.

In at least one embodiment, tagging is not fully deterministic, because it may not be fully known when the program will play in the future and at what stations. In some such cases, the detection can be based on statistics from the historical data, and a program on a new day need not exactly match an identified reference program. For example, the new program may not air at same hour and on the same stations). Method 200 ends at block 299.

Referring next to FIG. 3, an example of matching conditions is shown for buckets on different stations. The left-hand column shows the station and bucket being compared, while columns to the right show bucket contents. So, for example, bucket S1:B12, shown on the top row of FIG. 3, includes content item 3, content item 2, content item 4, content item 1, and a spot block. Bucket S2:B4 includes content item 1, content item 2, a spot block, content item 3, and content item 4. Even though bucket S2:B4 contains the same four content items as bucket S1:B12 according to at least one embodiment these two buckets do not match, because the content items are not in the same order. Buckets S1:B12 and S3:B16 are also examples of non-matches, because the order of the content in each of the two blocks is different.

In contrast to the above example, buckets S2:B4 and S3:B16 are considered to be matching buckets in at least one embodiment. Bucket S2:B4 contains content items 1-4, with a spot block inserted between content items 2 and 3. Bucket S3:B16 includes content items 2-5, with a spot block inserted between content items 4 and 5. According to at least one embodiment, buckets S2:B4 and S3:B16 match, because they include over 50% common content, and in the content, items are in the same order. Note that in various embodiments, the order of the content items represents the order in which the content items were played or broadcast. In some embodiments, the fact that the content items are in the proper sequence is sufficient for a match, even though the content items may not be consecutive. Thus, content items 2-4 of bucket S2:B4 are in the same order as content items 2-4 of bucket and S3:B16.

Referring next to FIG. 4, examples of matching and non-matching sequences according to various embodiments of the present disclosure are discussed. FIG. 4 shows matching time sequences, or buckets, included in the first twelve buckets (B1-B12) of seven stations (S1-S7). Buckets that are not considered to be matching buckets are not shown. In the illustrated example, station S1, bucket B1 (S1:B1) matches the following buckets: S2:B6; S4:B1; S6:B3; and S7:B1. Note that each of the buckets that matches S1:B1 is illustrated as including content "A," which does not necessarily indicate identical content, but which does indicate content meeting threshold criteria for matching buckets, which has been previously discussed with reference to FIG. 3.

Main Sequences

Consider first the sequence of matching buckets S1:B1-B8 (i.e., buckets B1-B8 on station S1). The following discussion is based on an embodiment in which each bucket represents a 15 minute time interval, a main sequence includes two or more matched buckets on three or more stations, and the two or more buckets are part of a sequence that is at least an hour long. Other embodiments can be implemented consistent with the teachings set forth herein.

In determining whether all or a part of the sequence S1:B1-B8 is a main sequence, S1:B1-B2 can be compared to each sequence of two matching buckets on each station to identify matching bucket sequences. In the example illustrated in FIG. 4, during a first iteration of comparisons, buckets S1:B1-B2 are found to match buckets S2:B6-B7, S4:B1-B2, S6:B3-B4 and S7:B1-B2. A second iteration of comparisons can be performed to identify matches for buckets S1:B2-B3. In the example illustrated in FIG. 4, during the second iteration of comparisons, buckets S2:B7-B8, S3:B6-B7, S6:B4-B5, S7:B2-B3 are identified as matches for buckets S1:B1-B2. A third iteration of comparisons can also be performed, resulting in buckets S2:B8-B9, S3:B7-B8, S5:B7-B8, S6:B5-B6, S7:B3-B4 being identified as matches for buckets S1:B3-B4. Additional iterations can be performed until the matched buckets on station S1 are fully compared against the matched buckets on the other stations. Based on these comparisons, and applying the example criteria for a sequence of buckets to be considered a main sequence, buckets S1:B1-B8 are considered a main sequence.

Continuing with the same example, the buckets S4:B1-B4 will not be considered a main sequence. On a first iteration used to compare buckets on other stations to buckets S4:B1-B2, to sequences of buckets on other stations, buckets S1:B1-B2, S2:B6-B7, S6:B3-B4, and S7:B1-B2 are found to be matches. On the second iteration an attempt is made to find buckets matching S4:B2-B3. But the sequence B-I, representing the contents of buckets S4:B2-B3 is not repeated in any other station. Consequently, the only match will be S4 B1-B2, which is less than an hour and will be rejected. Note that in later iterations of this example, it will be determined that S4:B3-B4 is a potential main sequence (different from S4:B1-B2), but S4:B3-B4 will also be rejected as a main sequence because it does not meet a minimum length requirement.

Each sequence of two matching buckets from each station can be compared against each sequence of two matching buckets on the other stations until all of the sequences of two matching buckets have been compared against each other. After all of the comparisons have been made, the present example will yield the following main sequences: S1:B1-B8, S2:B6-B11, S5 B7-B10, S6 B3-B10, and S7 B1-B5. Each of these sequences meets the criteria used for this example, as discussed above. Station S4 does not included a main sequence for the reasons discussed above, and station S3 does not include a main sequence, because the sequence on station S3 is not at least one hour long.

Removing Selected Sequences

In at least some embodiments, after the main sequences have been determined, certain of the main sequences are removed based on various criteria. When comparing main sequences for purposes of identifying main sequences to be removed, the main sequence used as the basis for the comparison is called the main sequence, and main sequences of other stations are referred to as secondary sequences.

For purposes of this example, assume that a secondary sequence is to be removed if it includes less than a given percentage of the total number of content items included in the main sequence, excluding spots and station identification breaks. So, for example, if a main sequence includes 20 songs, and a secondary sequence includes only 5 of those same songs, the secondary sequence includes only 25% of the songs in the main sequence, and the secondary sequence can be removed from consideration. In the example illustrated in FIG. 4, when using the main sequence for station S1, i.e., S1:B1-B5, secondary sequences S4:B1-B4 and S5:B7-B10 might be removed from consideration. Note that in some embodiments, the number of matching buckets does not necessarily determine the percentage of matching content for an entire main sequence.

In various embodiments, after one or more of the secondary sequences have been removed from consideration, another check is made to determine whether the main sequence still matches other sequences on at least a minimum number of stations. For example, if the main sequences for stations S4 and S5 have been removed from consideration, the main sequence for station S1 matches the main sequences for stations S2, S6, and S7. If the threshold number of stations is 3, then the main sequence for station S1 can be kept, but if the threshold number of stations is 5, then the main sequence for station S1 can be removed from further consideration.

Consolidating Sequences

In various embodiments, after main sequences are determined and certain sequences are removed from consideration, the remaining main sequences can be consolidated. In some of these embodiments, two main sequences are compared, and if both of the main sequences are present on at least a given percentage of stations under consideration, and if the two main sequences meet threshold size difference criteria, the two main sequences can be merged. For example, if the threshold percentage of stations is 40%, and the threshold size difference requires the longer sequence to be no more than two times the size of the shorter sequence, then buckets S1:B1-B5 and S2:B6-B9 can be merged, because each of the main sequences is present on at least 3 out of 7 stations, and the longer of the two sequences is not more than two times the size of the shorter sequence.

Figure 5:
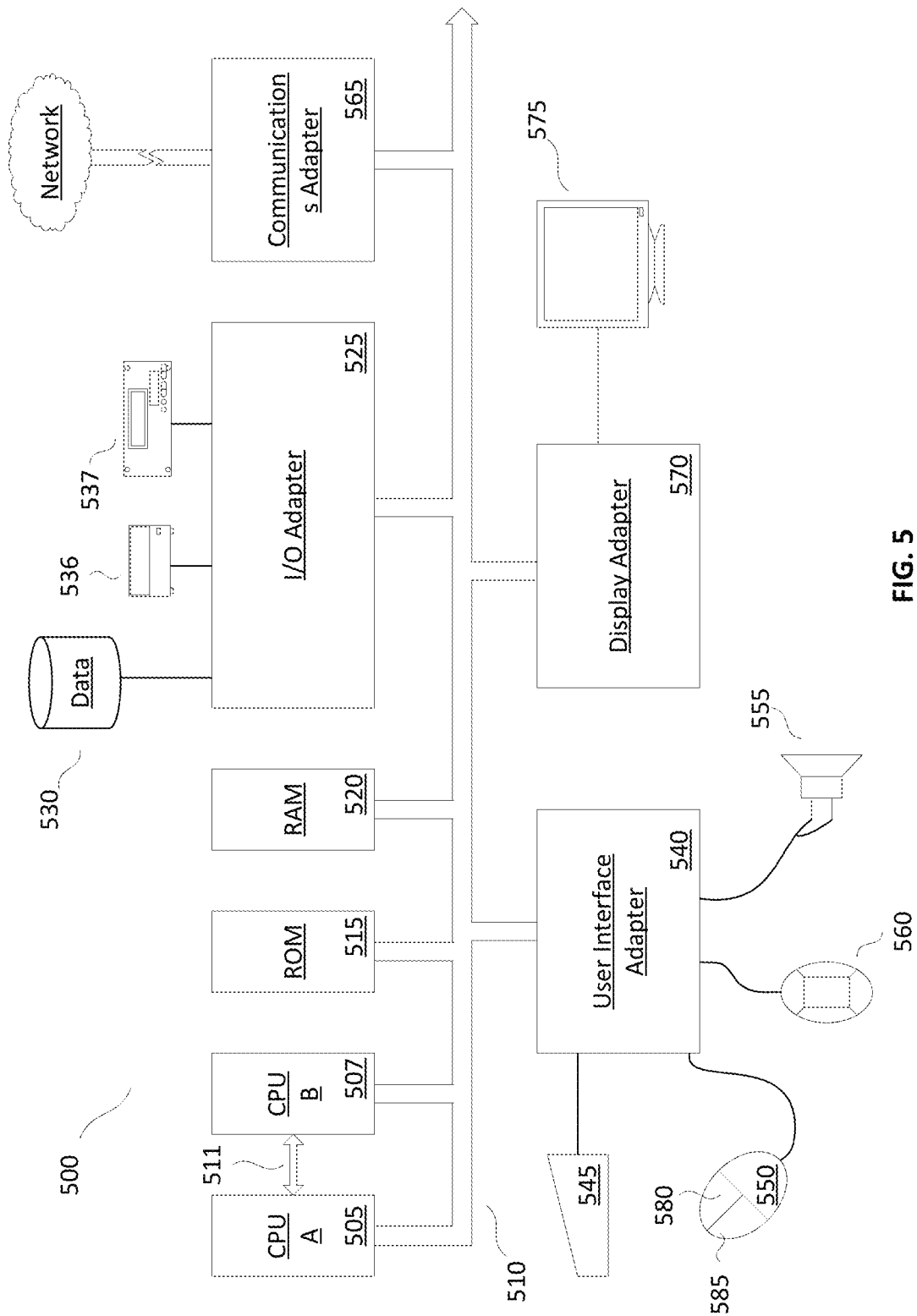
FIG. 5 is a high level block diagram of a processing system according to an embodiment of the present disclosure.

Some or all of the methods and processes described herein can be embodied in or performed by one or more processing systems. An example of such a processing system is discussed with reference to FIG. 5. Processing system 500 includes random access memory (RAM) 520; read-only memory (ROM) 515, wherein the ROM 515 could also be erasable programmable read-only memory (EPROM) or electrically erasable programmable read-only memory (EEPROM); and input/output (I/O) adapter 525, for connecting peripheral devices such as disk units 530, optical drive 536, or tape drive 537 to system bus 510; a user interface adapter 540 for connecting keyboard 545, mouse 550, speaker 555, microphone 560, or other user interface devices to system bus 510; communications adapter 565 for connecting processing system 500 to an information network such as the Internet or any of various local area networks, wide area networks, telephone networks, or the like; and display adapter 570 for connecting system bus 510 to a display device such as monitor 575. Mouse 550 has a series of buttons 580, 585 and may be used to control a cursor shown on monitor 575.

It will be understood that processing system 500 may include other suitable data processing systems without departing from the scope of the present disclosure. For example, processing system 500 may include bulk storage and cache memories, which provide temporary storage of at least some program code in order to reduce the number of times code must be retrieved from bulk storage during execution.

Various disclosed embodiments can be implemented in hardware, software, or a combination containing both hardware and software elements. In one or more embodiments, the invention is implemented in software, which includes but is not limited to firmware, resident software, microcode, etc. Some embodiments may be realized as a computer program product, and may be implemented as a computer-usable or computer-readable medium embodying program code for use by, or in connection with, a computer, a processor, or other suitable instruction execution system.

For the purposes of this description, a computer-usable or computer readable medium can be any apparatus that can contain, store, communicate, or transport the program for use by or in connection with an instruction execution system, apparatus, or device. By way of example, and not limitation, computer readable media may comprise any of various types of computer storage media, including volatile and non-volatile, removable, and non-removable media implemented in any suitable method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by a computer.

Various embodiments have been described for identifying syndicated content and detecting media programs. Other variations and modifications of the embodiments disclosed may be made based on the description provided, without departing from the scope of the invention as set forth in the following claims.

What is claimed is:

1. A method comprising:
   identifying a plurality of main sequences of media items played by a plurality of different media stations, wherein each of the plurality of main sequences includes one or more content items, and wherein each of the plurality of main sequences is to be considered as potentially including syndicated content, wherein the syndicated content being content played by multiple of the plurality of different media stations;
   removing at least one main sequence of the plurality of main sequences to generate a plurality of remaining main sequences, wherein the at least one main sequence is removed based, at least in part, on a number of content items included in the at least one main sequence;
   generating a plurality of consolidated main sequences by merging multiple of the plurality of remaining main sequences satisfying a consolidation criterion, wherein each of the plurality of consolidated main sequence includes two or more of the plurality of remaining main sequences;
   comparing the plurality of consolidated main sequences to determine whether the syndicated content was played on a particular media station of the plurality of different media stations; and
   generating and outputting a report identifying the syndicated content and the particular media station.

2. The method of claim 1, wherein:
   the consolidation criterion is satisfied, at least in part, if the multiple of the plurality of remaining main sequences being merged are present on a threshold number of media stations.

3. The method of claim 2, wherein:
   a first main sequence present on a first media station is considered to be present on a second media station if a second main sequence present on the second media station is a subset of the first main sequence.

4. The method of claim 2, wherein:
   the consolidation criterion is satisfied, at least in part, if the multiple of the plurality of remaining main sequences being merged meet a size-difference threshold.

5. The method of claim 1, further comprising:
   removing a first main sequence based, at least in part, on a number of content items included in the first main sequence that match content items included in a second main sequence.

6. The method of claim 1, further comprising:
   determining whether a threshold number of the plurality of remaining main sequences is present after removing the at least one main sequence.

7. The method of claim 1, further comprising:
   dividing each of the plurality of main sequences into fixed-time-interval buckets; and
   removing the at least one main sequence based, at least in part, on a first number of buckets in the at least one main sequence that match a second number of buckets in other main sequences.

8. A syndicated content recognition system comprising:
   a hardware processor;
   a memory coupled to the hardware processor, the memory storing computer-executable instructions; and wherein the hardware processor is configured to execute the computer-executable instructions to cause the syndicated content recognition system to:
   identify a plurality of main sequences of media items played by a plurality of different media stations, wherein each of the plurality of main sequences includes one or more content items, and wherein each of the plurality of main sequences is to be considered as potentially including syndicated content, wherein the syndicated content being content played by multiple of the plurality of different media stations;
   remove at least one main sequence of the plurality of main sequences to generate a plurality of remaining main sequences, wherein the at least one main sequence is removed based, at least in part, on a number of content items included in the at least one main sequence;
   generate a plurality of consolidated main sequences by merging multiple of the plurality of remaining main sequences satisfying a consolidation criterion, wherein each of the plurality of consolidated main sequence includes two or more of the plurality of remaining main sequences; and
   compare the plurality of consolidated main sequences to determine whether the syndicated content was played on a particular media station of the plurality of different media stations; and
   generate and output a report identifying the syndicated content and the particular media station.

9. The syndicated content recognition system of claim 8, wherein:
   the consolidation criterion is satisfied, at least in part, if the multiple of the plurality of remaining main sequences being merged are present on a threshold number of media stations.

10. The syndicated content recognition system of claim 9, wherein:
    a first main sequence present on a first media station is considered to be present on a second media station if a second main sequence present on the second media station is a subset of the first main sequence.

11. The syndicated content recognition system of claim 9, wherein:
    the consolidation criterion is satisfied, at least in part, if the multiple of the plurality of remaining main sequences being merged meet a size-difference threshold.

12. The syndicated content recognition system of claim 8, wherein the hardware processor is further configured to execute the computer-executable instructions to cause syndicated content recognition system to:
    remove a first main sequence based, at least in part, on a number of content items included in the first main sequence that match content items included in a second main sequence.

13. The syndicated content recognition system of claim 8, wherein the hardware processor is further configured to execute the computer-executable instructions to cause syndicated content recognition system to:
  determining whether a threshold number of the plurality of remaining main sequences is present after removing the at least one main sequence.

14. The syndicated content recognition system of claim 8, wherein the hardware processor is further configured to execute the computer-executable instructions to cause syndicated content recognition system to:
  divide each of the plurality of main sequences into fixed-time-interval buckets; and
  remove the at least one main sequence based, at least in part, on a first number of buckets in the at least one main sequence that match a second number of buckets in other main sequences.

15. A non-transitory computer readable medium tangibly embodying a program of instructions configured to be stored in a memory and executed by a processor, the program of instructions including:
  at least one instruction configured to identify a plurality of main sequences of media items played by a plurality of different media stations, wherein each of the plurality of main sequences includes one or more content items, and wherein each of the plurality of main sequences is to be considered as potentially including syndicated content, wherein the syndicated content being content played by multiple of the plurality of different media stations;
  at least one instruction configured to remove at least one main sequence of the plurality of main sequences to generate a plurality of remaining main sequences, wherein the at least one main sequence is removed based, at least in part, on a number of content items included in the at least one main sequence;
  at least one instruction configured to generate a plurality of consolidated main sequences by merging multiple of the plurality of remaining main sequences satisfying a consolidation criterion, wherein each of the plurality of consolidated main sequence includes two or more of the plurality of remaining main sequences;
  at least one instruction configured to compare the plurality of consolidated main sequences to determine whether the syndicated content was played on a particular media station of the plurality of different media stations; and
  at least one instruction configured to generate and output a report identifying the syndicated content and the particular media station.

16. The non-transitory computer readable medium of claim 15, wherein:
  the consolidation criterion is satisfied if the multiple of the plurality of remaining main sequences being merged are present on a threshold number of media stations; and
  the multiple of the plurality of remaining main sequences being merged meet a size-difference threshold.

17. The non-transitory computer readable medium of claim 16, wherein:
  a first main sequence present on a first media station is considered to be present on a second media station if a second main sequence present on the second media station is a subset of the first main sequence.

18. The non-transitory computer readable medium of claim 15, wherein the program of instructions further includes:
  at least one instruction configured to remove a first main sequence based, at least in part, on a number of content items included in the first main sequence that match content items included in a second main sequence.

19. The non-transitory computer readable medium of claim 15, wherein the program of instructions further includes:
  at least one instruction configured to determine whether a threshold number of the plurality of remaining main sequences is present after removing the at least one main sequence.

20. The non-transitory computer readable medium of claim 15, wherein the program of instructions further includes:
  at least one instruction configured to divide each of the plurality of main sequences into fixed-time-interval buckets; and
  at least one instruction configured to remove the at least one main sequence based, at least in part, on a first number of buckets in the at least one main sequence that match a second number of buckets in other main sequences.

* * * * *